(12) United States Patent
Arbatti

(10) Patent No.: US 11,914,604 B2
(45) Date of Patent: Feb. 27, 2024

(54) METRIC TIME SERIES GENERATION USING TELEMETRY DATA PROCESSING SYSTEM

(71) Applicants: Atlassian Pty Ltd., Sydney (AU); Atlassian Inc., San Francisco, CA (US)

(72) Inventor: Varun Vinod Arbatti, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 141 days.

(21) Appl. No.: 17/708,320

(22) Filed: Mar. 30, 2022

(65) Prior Publication Data

US 2023/0315747 A1  Oct. 5, 2023

(51) Int. Cl.
  *G06F 16/2458* (2019.01)
  *G06F 16/22* (2019.01)
  *G06F 16/2455* (2019.01)

(52) U.S. Cl.
  CPC ...... *G06F 16/2477* (2019.01); *G06F 16/2255* (2019.01); *G06F 16/24564* (2019.01)

(58) Field of Classification Search
  CPC ............. G06F 16/2477; G06F 16/2255; G06F 16/24564
  See application file for complete search history.

(56) References Cited

U.S. PATENT DOCUMENTS

2014/0320500 A1\* 10/2014 Fletcher .............. G06F 11/3409
  345/440
2017/0250889 A1\* 8/2017 Vogt ........................ G06F 16/00

\* cited by examiner

*Primary Examiner* — Cam Y T Truong
(74) *Attorney, Agent, or Firm* — Brownstein Hyatt Farber Schreck, LLP

(57) ABSTRACT

A system and a method for a metric time series (MTS) generation. The method includes operations of receiving telemetry data comprising a metric name, a new measurement value, and metadata associated with the metric name, and generating a hash key value based on the metric name and a set of key-value pairs of a plurality of key-value pairs included in the metadata. The method includes determining whether the generated hash key value exists in a memory, and in response to determining that the generated hash key value does not exist in the memory, initializing an MTS associated with the generated hash key with a measurement value being set to zero. The method includes an instance of the MTS corresponding to a current time, and associating the instance of the MTS with the new measurement value received in the telemetry data.

20 Claims, 8 Drawing Sheets

METRIC TIME SERIES GENERATION USING TELEMETRY DATA PROCESSING SYSTEM

TECHNICAL FIELD

Embodiments described herein relate to a telemetry data processing system and, in particular, to systems and methods for generating metric time series based on the telemetry data.

BACKGROUND

Telemetry data provided by a cloud infrastructure host is useful to an organizational customer, hosting one or more services instantiated over cloud infrastructure provided by the cloud infrastructure host, for debugging and/or troubleshooting. The telemetry data may include information such as, but not limited to, capacity, availability, requests served without error, requests that resulted in an error, and so on. As may be appreciated, the organizational customer of the cloud infrastructure host expects that telemetry data provides accurate information at all times.

However, for an undeterminable period of time after startup, conventional telemetry systems report inaccurate or incomplete data as initial information is received and aggregated from one or more services instantiated over the cloud infrastructure. This effect of conventional telemetry systems may be particularly problematic for low volume organizational customers.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
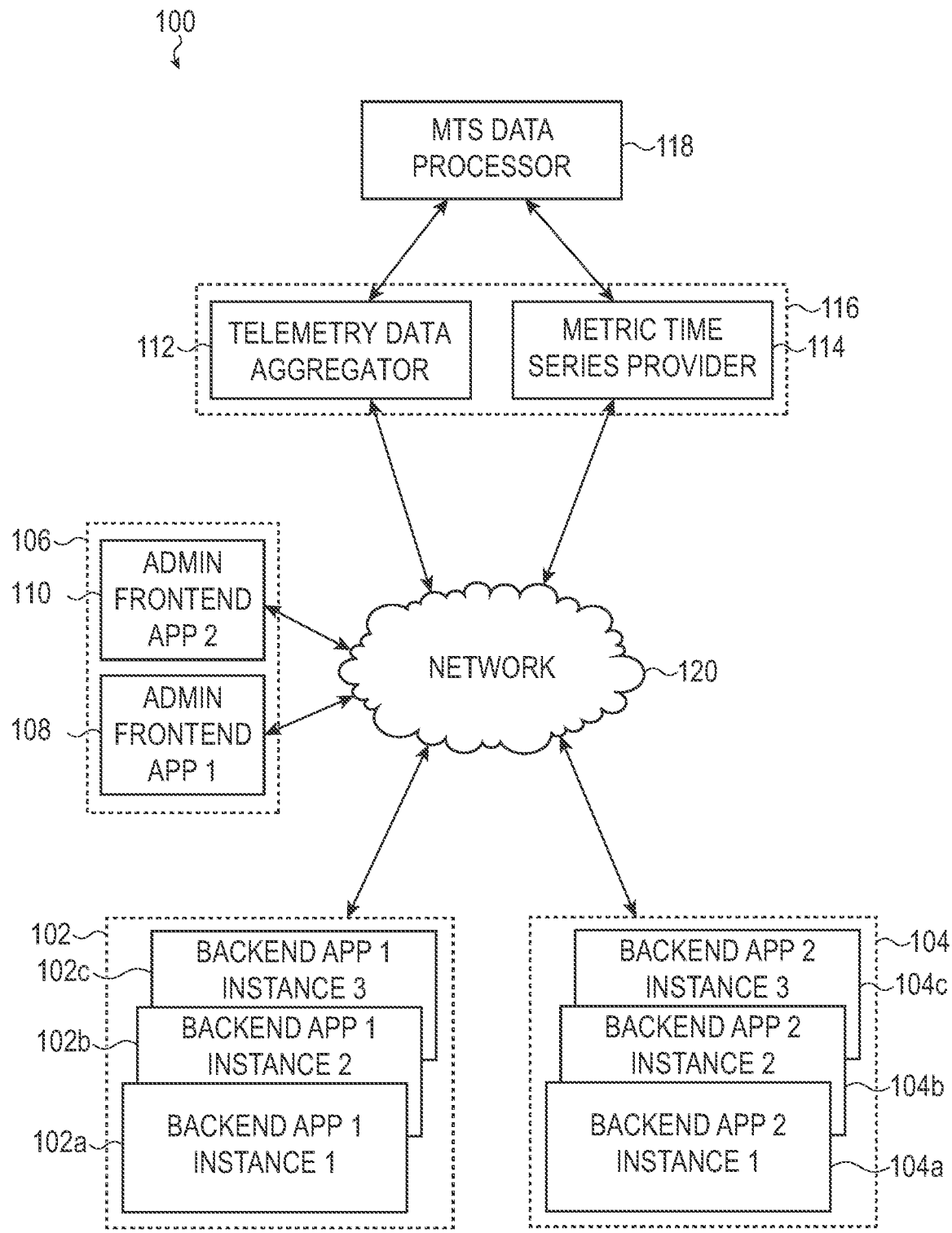
FIG. 1 depicts an example computing environment, as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for generating metric time series (MTS) datasets from received telemetry data describing operation or status of a server instance (or more simply, "server"), which may be executing on one or more virtual machines or hardware platforms. MTS datasets may provide a customer of a cloud infrastructure an immediate snapshot of performance of an application instance (e.g., software application instances) and/or a server instance (e.g., hardware platform or a virtual machine). Any inaccuracy in MTS datasets may therefore be critical for evaluation of the performance of the application instance and/or the server instance. Accordingly, various embodiments described herein relate to systems and methods for generating accurate MTS datasets solving problems in conventional telemetry systems that report inaccurate or incomplete data as initial information is received and aggregated from one or more services instantiated over the cloud infrastructure. As described herein, an MTS is generated from a number of MTS datasets that are received as telemetry data at a particular interval of time, in which telemetry data includes a measurable numeric value of a particular variable (metric) which may changes over time. Thus, an MTS represents a sequence of numeric values of a particular variable over a time period.

More generally, as may be appreciated by a person of skill in the art, a server instance that reports, or is the subject of, telemetry data, may report various server-level diagnostic or performance information such as memory utilization, processor utilization, network utilization, bandwidth, request volume, uptime, and so on. In other architectures, an application instance leveraging a server may also report telemetry data. For example, an application instance that reports, or is the subject of, telemetry data may report various application-level diagnostic or performance information such as a number of requests received, a number of requests sent, a number of responses sent, a number of responses received, a number of errors occurred for each different type of error, and so on.

As described herein, telemetry data—regardless of source or subject—can be received and aggregated by a telemetry data aggregator, which can store received telemetry data in an MTS database, which can later be queried to calculate one or more metrics that can be used to inform administrative or maintenance decisions regarding a server or application reporting telemetry data. A telemetry data aggregator can send the received telemetry data to another application or a service, for example, an MTS data processor, which may process telemetry data and generate an MTS.

In some embodiments, and by way of a non-limiting example, telemetry report may include telemetry data including a metric name and metadata associated with the metric name. The metadata may include source environment information, a measurement value, and/or a timestamp, as described herein.

In some of the existing MTS data processors, when a telemetry report is received from a source environment associated with a metric name, the MTS data processor may store the metric name, source environment information, a measurement value, and a corresponding timestamp, as a record, in a database. When an MTS is requested, the MTS data processor may generate the MTS based on a number of records stored in the database corresponding to the metric name and the source environment information as a progress over time based on timestamp associated with each record of the number of records. In this process, the MTS data processor thus initializes an MTS corresponding to the metric name and the associated source environment with a measurement value received in the first telemetry report for the MTS as a baseline value. Subsequent telemetry reports received from the source environment and for the corresponding metric name are then represented in the MTS as showing a change over time with reference to the baseline value set from the first received telemetry report.

As a result, a customer evaluating performance of an application instance based on a total number of server exception error 500 occurred since beginning of a particular application instance's execution on a server may get incorrect performance statistics data because a number of server exception error 500 reported in the first telemetry report is considered by the MTS data processor as the baseline value and used to initialize an MTS. For a customer having large traffic volume, this inaccuracy as a percentage may be negligible, but for a customer having relatively small traffic volume, this inaccuracy as a percentage may be large enough to determine and evaluate performance against a service level agreement.

Embodiments described herein are directed to solve the above technical problem of an MTS data processor, which stores telemetry data for an MTS based on an associated metric name, source environment information, a measurement value, and corresponding timestamp as a record in a database for generating an MTS. In some embodiments, when telemetry data is received at an MTS data processor, a unique hash key value may be generated based on a metric name and source environment information included in the received telemetry data. An example telemetry data may be as shown below:

---

Application1_backend_invocation_error {appId = "11111111-1111-4111-A111-11111110035", instanceId = "instance100", environmentId = "11111111-1111-4111-A111-11111110100", userTier = "high", errorType = "500"} 10

---

In the above example telemetry data, Application1_backend_invocation_error may represent a metric name, a number of key-value pairs in { } may represent source environment information or identify a particular source environment, and a value 10 may represent a measurement value to be displayed or presented as associated with a metric time series instance corresponding to a time when the telemetry data is received by an MTS data processor.

Each key-value pair may describe a different aspect or dimension of the source environment. Accordingly, each MTS may be associated with a unique combination of a metric name and a corresponding source environment. However, telemetry data may be received from a different version of an application instance with a different number of keys, and/or key-value pairs in telemetry data may be in a different order, which may affect determining of a unique combination of a metric name and a corresponding source environment.

In some embodiments, for identifying whether telemetry data is received at an MTS data processor for a particular MTS, the MTS data processor may generate a hash key value corresponding to a metric name and a set of key-value pairs of a number of key-value pairs received in telemetry data before storing the telemetry data in a database as a record, as described herein. In one example, for generating a unique hash key value corresponding to a metric name and a set of key-value pairs of a number of key-value pairs received in telemetry data, in some embodiments, keys of the set of key-value pairs may be sorted according to a specific order, such as, an ascending order, a descending order, or a user-specified order.

In some embodiments, by way of a non-limiting example, a set of key-value pairs may include all, or a subset of all, key-value pairs received in telemetry data. In some embodiments, a subset of all key-value pairs received in telemetry data for generating a unique hash key corresponding to a metric name and a set of key-value pairs may be user specified.

In some embodiments, the generated hash key value, for example, may be a one-way hash key value. In some embodiments, a unique hash key value may be generated using, for example, a one-way hash function. However, other method or function, such as, a checksum, a fingerprint, and/or a cryptographic hash function, may also be used to generate a unique hash key value corresponding to a metric name and a set of key-value pairs of a number of key-value pairs received in telemetry data. In some embodiments, by way of a non-limiting example, a unique string ID or series ID of a predetermined length may be generated corresponding to a metric name and a set of key-value pairs of a number of key-value pairs received in telemetry data using a user-defined algorithm.

For an example telemetry data shown herein, a generated unique hash key value may be as shown below, in which a measurement value received in telemetry data is omitted for generating a unique hash key.

| Metric Notation Telemetry Data | Hash Key Value |
| --- | --- |
| Application1_backend_invocation_error {appId = "11111111-1111-4111-A111-11111110035", instanceId = "instance100", environmentId = "11111111-1111-4111-A111-11111110100", userTier = "high", errorType = "500"} | 12527784466464696499911379 1defabc68363737fe120079646619 46146846196 |

In some embodiments, the generated unique hash key value may be stored in a memory that may be communicatively coupled with an MTS data processor. In one example, the memory may be a database, such as an in-memory database, a local database, and/or a remote database. In one example, the database may be a relational database, a key-value database, and so on. In some embodiments, metric notation telemetry data excluding a measurement value received in telemetry data and a generated hash key value may be stored in the database as a key-value pair. In some embodiments, only the generated hash key value may be stored in the database.

In some embodiments, an MTS data processor may generate a unique hash key value upon receiving telemetry data, as described herein, and determine whether the generated unique hash key value exists where the MTS data processor stores the generated unique hash key values. If the MTS data processor determines that a unique hash key value generated corresponding to the received telemetry data does not exist, the MTS data processor may determine that the telemetry data is received for the first time for an MTS associated with a metric name and corresponding source environment information. The MTS data processor may then initialize the MTS by adding a database record corresponding to the MTS associated with the metric name and corresponding source environment information with a measurement value that is set to zero (or any other user-specified value), and adding another database record corresponding to the MTS associated with the metric name and corresponding source environment information with a measurement value as received in the telemetry data for a first instance of the MTS. A timestamp corresponding to the first instance, for example, a current timestamp, may also be set, for example, in a predetermined or preconfigured time format.

However, if the MTS data processor determines that a unique hash key value generated corresponding to the received telemetry data already exists, the MTS data processor may then add a database record corresponding to the MTS associated with the metric name and corresponding source environment information with a measurement value as received in the telemetry data as an instance of the MTS corresponding to a timestamp at which the telemetry data is received by the MTS data processor.

Accordingly, as described herein, adding an additional database record with a measurement value set to zero (or any other user-specified value) while adding a database record with a measurement value set to a measurement value as received in telemetry data when a unique hash key generated corresponding to a metric name and associated source environment information is not found, cures deficiency of a conventional telemetry data aggregator and/or an MTS data processor.

In some embodiments, the MTS data processor may also keep a record of when telemetry data corresponding to a unique hash key value stored in a memory is received. If telemetry data corresponding to a hash key stored in a memory is not received for a predetermined time period, the MTS data processor may remove the hash key from the memory.

Various embodiments described above are thus related to systems and methods for processing telemetry data for generating an MTS. In the following sections, various embodiments are described using drawings. These foregoing and other embodiments are discussed below with reference to FIGS. 1-8. However, those skilled in the art will readily appreciate that the detailed description given herein with respect to these figures is for explanation only and should not be construed as limiting.

FIG. 1 depicts an example computing environment in, or over which, embodiments as described herein may be implemented. As shown in FIG. 1, a computing environment 100 may include a number of a first backend application instances 102 and a number of a second backend application instances 104. In one example, the first backend application instances 102 may include a backend app1 instance 1 102a, a backend app1 instance 2 102b, and a backend app1 instance 3 102c, and so on, and the second backend application instances 104 may include a backend app2 instance 1 104a, a backend app2 instance 2 104b, and a backend app2 instance 3 104c, and so on. In one example, the first backend application may be an issue tracking system (ITS) and the second backend application may be a document management system.

In some embodiments, each of the first backend application instances and the second backend application instances may be executing on one or more hardware platforms and/or one or more virtual machine instances. The one or more hardware platforms and/or the one or more virtual machine instances may be hosted in a cloud infrastructure.

In some embodiments, one or more of the first backend application instances and/or one or more of the second backend application instances may report various performance and monitoring data (hereinafter "telemetry data") to a telemetry data aggregator 112. In FIG. 1, only one instance of telemetry data aggregator 112 is shown, but there may be more than one instance of a telemetry data aggregator 112 for load sharing and/or redundancy purposes.

In some embodiments, by way of a non-limiting example, the telemetry data aggregator 112 may be a monolithic application, a webservice such as a representational state transfer (REST) webservice, or a microservice, and the telemetry data may be sent to the telemetry data aggregator 112 as a JavaScript Object Notation (JSON) object, a hyper-text markup language (html) payload, or so on.

In some embodiments, the telemetry data aggregator 112 may perform authentication and validation of the received telemetry data. The telemetry data aggregator 112 may authenticate a source sending telemetry data to the telemetry data aggregator 112. In one example, authentication of a source sending telemetry data may be performed using a white list including an IP address of a source allowed to send telemetry data to the telemetry data aggregator 112. The telemetry data aggregator 112 may validate the received telemetry data, for example, to verify that the received telemetry data is encoded and formatted according to a predetermined specification.

In some embodiments, the telemetry data aggregator 112 may be communicatively coupled with an MTS data processor 118, and may transmit the authenticated and/or validated telemetry data to the MTS data processor 118 for processing and generating an MTS.

In some embodiments, and by way of a non-limiting example, the MTS data processor 118 may be implemented as a monolithic application, a webservice such as a REST webservice, or a microservice, and the authenticated and/or validated telemetry data may be transmitted to the MTS data processor as a JSON object, an html payload, or so on.

As described herein, in accordance with some embodiments, and by way of a non-limiting example, the received, authenticated, and/or validated telemetry data at the telemetry data aggregator 112 and/or the MTS data processor 118 may be in the format as shown below:

---

Application1_backend_invocation_error {appId = "11111111-1111-4111-A111-11111110035", instanceId = "instance100", environmentId = "11111111-1111-4111-A111-11111110100", userTier = "high", errorType = "500"} 10

---

In the above example telemetry data, an appId value may correspond to the first backend application that is backend application 1 and an instanceId value may correspond to, for example, the backend app1 instance 1 102*a*. An environmentId value may identify a particular site or location where this application may be hosted or executing. The above example telemetry data is about reporting a server exception error with a code type 500, and therefore a key errorType with its value set to 500 is included in the telemetry data.

Further in the above example telemetry data, Application1_backend_invocation_error may specify a metric name. In the present example, the metric name Application1_backend_invocation_error suggest that the telemetry data is related to invocation error of a backend application Application1.

A number of key-value pairs in { } in the above example telemetry data may represent source environment information identifying a source environment, as described herein, in accordance with some embodiments. Each key-value pair may represent a different aspect or dimension of the source environment. Accordingly, each MTS may be associated with a unique combination of a metric name and a corresponding source environment. In one example, telemetry data received from the backend app1 instance 2 102*b* and the backend app1 instance 1 102*a* each may have a different value of instanceId, and therefore, telemetry data received from the backend app1 instance 2 102*b* and the backend app1 instance 1 102*a* may be associated with a different MTS for invocation error of a backend application because different source environment is identified telemetry data from the backend app1 instance 2 102*b* and the backend app1 instance 1 102*a*.

In some embodiments, as described herein, the MTS data processor 118 may generate a unique hash key value based on a metric name and a set of key-value pairs of a number of key-value pairs received in telemetry data. In one example, for generating a unique hash key corresponding to a metric name and a set of key-value pairs of a number of key-value pairs received in telemetry data, keys of the set of key-value pairs may be sorted by the MTS data processor 118 according to a specific order, such as, an ascending order, a descending order, or a user-specified order.

In some embodiments, the specific order for sorting the key-value pairs may be stored as one or more profiles, in a memory. In some embodiments, by way of a non-limiting example, a set of key-value pairs may include all, or a subset of all, key-value pairs received in telemetry data, and/or may be user specified as provided or configured in one or more profiles stored in the memory. The subset of all key-value pairs received in telemetry data for generating a unique hash key value corresponding to a metric name and a set of key-value pairs may be user specified as provided or configured in one or more profiles stored in the memory.

In some embodiments. the memory may include a database, which may be, for example, an in-memory database, a local database, and/or a remote database. In one example, the database may be a relational database, a key-value database, and so on. The database may be communicatively coupled with the MTS data processor 118.

In some embodiments, the generated hash key value, for example, may be a one-way hash key value. In some embodiments, a unique hash key value may be generated using, for example, a one-way hash function. However, other method or function, such as, a checksum, a fingerprint, and/or a cryptographic hash function, may also be used to generate a unique hash key value corresponding to a metric name and a set of key-value pairs of a number of key-value pairs received in telemetry data.

In some embodiments, the generated unique hash key value may be stored in a memory that may be communicatively coupled with an MTS data processor 118. In some embodiments, metric notation telemetry data, as described herein, excluding a measurement value received in telemetry data and a generated unique hash key value, may be stored in a memory as a key-value pair. In one example, the memory may be a database, such as an in-memory database, a local database, and/or a remote database. In one example, the database may be a relational database, a key-value database, and so on.

In some embodiments, the MTS data processor 118 may generate a unique hash key value upon receiving telemetry data, as described herein, and determine whether the generated unique hash key value exists. If the MTS data processor 118 determines that a unique hash key value generated corresponding to the received telemetry data does not exist, the MTS data processor 118 may determine that the telemetry data is received for the first time for an MTS associated with a metric name and corresponding source environment information. The MTS data processor 118 may then initialize the MTS by adding a database record corresponding to the MTS associated with the metric name and corresponding source environment information with a measurement value that is set to zero (or any other user-specified value) and adding another database record corresponding to the MTS associated with the metric name and corresponding source environment information with a measurement value as received in the telemetry data for a first instance of the MTS. A timestamp corresponding to the first instance, for example, a current timestamp, may also be set, for example, in a predetermined or preconfigured time format However, if the MTS data processor 118 determines that a unique hash key value generated corresponding to the received telemetry data already exists, the MTS data processor 118 may then add a database record corresponding to the MTS associated with the metric name and corresponding source environment information with a measurement value as received in the telemetry data as an instance of the MTS corresponding to a timestamp at which the telemetry data is received by the MTS data processor.

In some embodiments, an MTS provider 114 may receive a request for an MTS from one or more frontend applications 106 including, for example, an admin frontend application1 108 and/or an admin frontend application2 110. In one example, the one or more frontend applications 106 may be a network monitoring application. The MTS provider 114 may be communicatively coupled with the MTS data processor 118 and receive data for an MTS requested in a request from an admin frontend application 108 or 110. The MTS provider 114 may transmit the data corresponding to the MTS chart to the admin frontend application 108 or 110 for rendering the requested MTS.

In many embodiments, the MTS provider 114 may include a rules engine that can perform one or more queries of MTS data. For example, some rules executed by the rules engine can be evaluated on a scheduled bases or may be executed in response to the MTS system receiving new telemetry data.

For example, in some cases, a rule executed by a rules engine can perform one or more calculations (e.g., time-based data items such as rates, averages over time, high and low values within a given time window, and so on) and/or may be configured to trigger one or more actions in response to a calculated or otherwise obtained value satisfying a threshold. For example, execution of a particular rule may cause a rate to be calculated, the rate based on a number of requests that have failed in a given time window. Thereafter, the calculated rate can be compared against a threshold rate that, if satisfied, initiates a process to generate a notification that may be displayed on an administrative interface.

In some embodiments, by way of a non-limiting example, the MTS provider 114 and the telemetry data aggregator 112 may be co-located and/or implemented as a single application, a single webservice, or a microservice 116.

In accordance with some embodiments, the number of first backend application instances 102, the number of second backend application instances 104, the MTS provider 114, the telemetry data aggregator 112, and/or the one or more frontend applications 106 may be communicatively coupled with a network 120. The network 120 may be a local area network (LAN), a wide area network (WAN), a cellular network such as a 3G network, a 4G or a long-term evolution (LTE) network, and/or a 5G network, and so on.

These foregoing embodiments depicted in FIG. 1 and the various alternatives thereof and variations thereto are presented, generally, for purposes of explanation, and to facilitate an understanding of various configurations and constructions of a user equipment, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
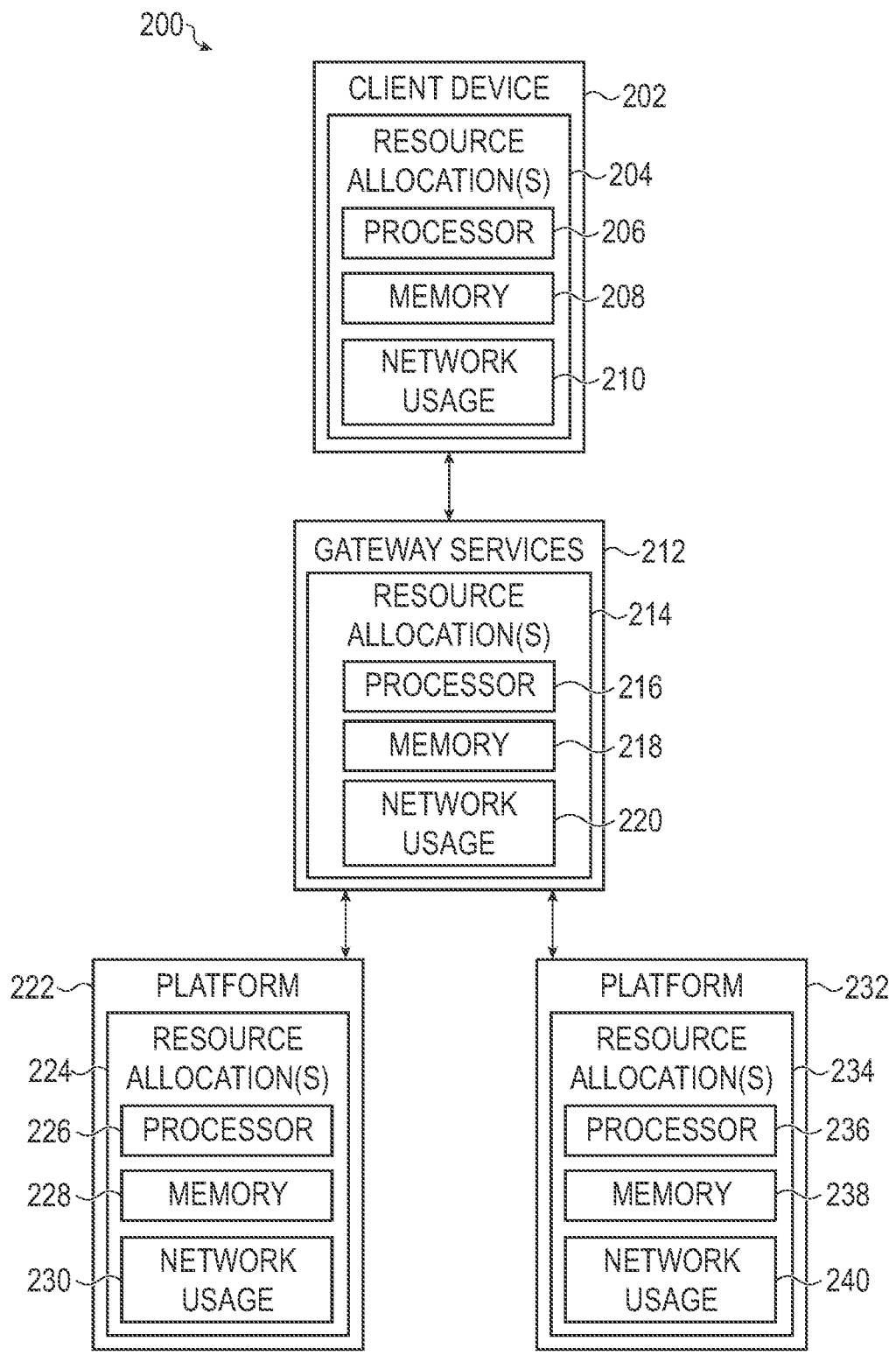
FIG. 2 depicts another example of a computing environment, as described herein.

FIG. 2 depicts another view of a computing environment in, or over which, embodiments as described herein may be implemented. As shown in a network 200, a client device 202, including one or more resource allocation modules 204, may be communicatively coupled to a first platform 222 and a second platform 232, including one or more resource allocation modules 224 and 234, respectively, via a gateway service 212. The gateway service 212 may also include one or more resource allocation modules 214.

In some embodiments, the network 200 may, for example, be an intra organization network, or multiple organization networks connected with each other via the network 120. A client device 202 may be a workstation, a computer, a laptop, a tablet, and/or another suitable client device. The client device 202 may be implemented as hardware or as a virtual machine. The one or more resource allocation modules 204 may allocate resources, including but not limited to, a processor or a computational resource 206, a memory 208, network usage or bandwidth 210, and so on, as required by the client device 202. The client device 202 may be running an application ("a client application") which may be a frontend application or an admin frontend application, referenced herein. In some cases, there may be more than one instance of the frontend application running on the client device 202.

The first platform 222 and the second platform 232 may be a sever, an application server, and/or an instance of a server. The first platform 222 and/or the second platform 232 may be implemented as hardware or as a virtual machine. The first platform 222 and the second platform 232 each may be running an application ("a server application") which may be a backend application, referenced herein. In some cases, there may be more than one instance of the backend application running on each of the first platform 222 and/or the second platform 232. The one or more resource allocation modules 224 and/or 234 may allocate resources, including but not limited to, a processor or a computational resource 226 and/or 236, a memory 228 and/or 238, network usage or bandwidth 230 and/or 240, and so on, as required by the first platform 222 and/or the second platform 232.

The gateway service 212 may act as a frontend, a broker, a load balancer, and/or a router for the first platform 222 and/or the second platform 232. The gateway service 212 may be implemented as hardware or a virtual machine. The one or more resource allocation modules 214 may allocate resources, including but not limited to, a processor or a computational resource 216, a memory 218, network usage or bandwidth 220, and so on, as required by the gateway service 212.

However, in some embodiments, and by way of a non-limiting example, the gateway service 212 may not be required for coupling the client device 202 to the first platform 222 and the second platform 232. The client device 202 may be directly coupled with the first platform 222 and the second platform 232.

In some cases, the client device 202, the gateway service 212, the first platform 222, and/or the second platform 232 may be a microservice, an executable code, a JavaScript, a library, a JAR file, and so on.

The client device 202 may include a processor and a memory. The processor may be any suitable computing device or logical circuit configured to execute one or more instructions to perform or coordinate one or more operations on or to digital data. In many embodiments, the processor or processors of the client device 202 may be a physical processor, although this is not required of all embodiments; virtual components may be suitable in some implementations. Similarly, a memory of the client device 202 may be configured and/or implemented in a number of suitable ways and may be partially or completely virtualized.

In some embodiments, the processor of the client device 202 is configured to access at least one executable asset from the memory of the client device 202. More particularly, the processor of the client device 202 may be configured to access a data store portion of the memory to load, into a working portion of the memory, at least one executable asset or executable program instruction. In response to loading the instruction or executable asset into working memory, the processor of the client device 202 may instantiate an instance of software referred to herein as a client application.

In many embodiments, a client application (also referred herein as a "frontend application") may be configured to provide client-side functionality of a software platform (a documentation or content creation service or other collaboration platform). More specifically, the client application may be configured to communicably couple to a separate instance of software executing on, and/or instantiated by, a host system or server configured to provide server-side ("backend") functionality of the hosted platform services, for example, the first platform 222 (e.g., an issue tracking system) and/or the second platform 232 (e.g., a document management system).

In this example, the first platform 222 and/or the second platform 232 may include a host server supporting the backend configured to operate within, or as, a virtual computing environment that is supported by one or more physical servers including one or more hardware resources such as, but not limited to (or requiring) one or more of: a processor allocation; a memory allocation (also referred as a working memory); non-volatile storage (also referred to as persistent memory); networking connections; and the like.

Further, it may be appreciated that although referred to as a singular "server", a host server supporting the backend may be a cluster of different computing resources, which may be geographically separated from one another. In this manner, because specific implementations may vary, both the host server (of the first platform 222 and the second platform 232) and the client device 202 can be referred to, simply, as "computing resources" configured to execute purpose-configured software (e.g., the frontend and the backend).

As used herein, the general term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

These foregoing embodiments depicted in FIG. 2 and the various alternatives thereof and variations thereto are presented, generally, for purposes of explanation, and to facilitate an understanding of various configurations and constructions of a user equipment, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3:
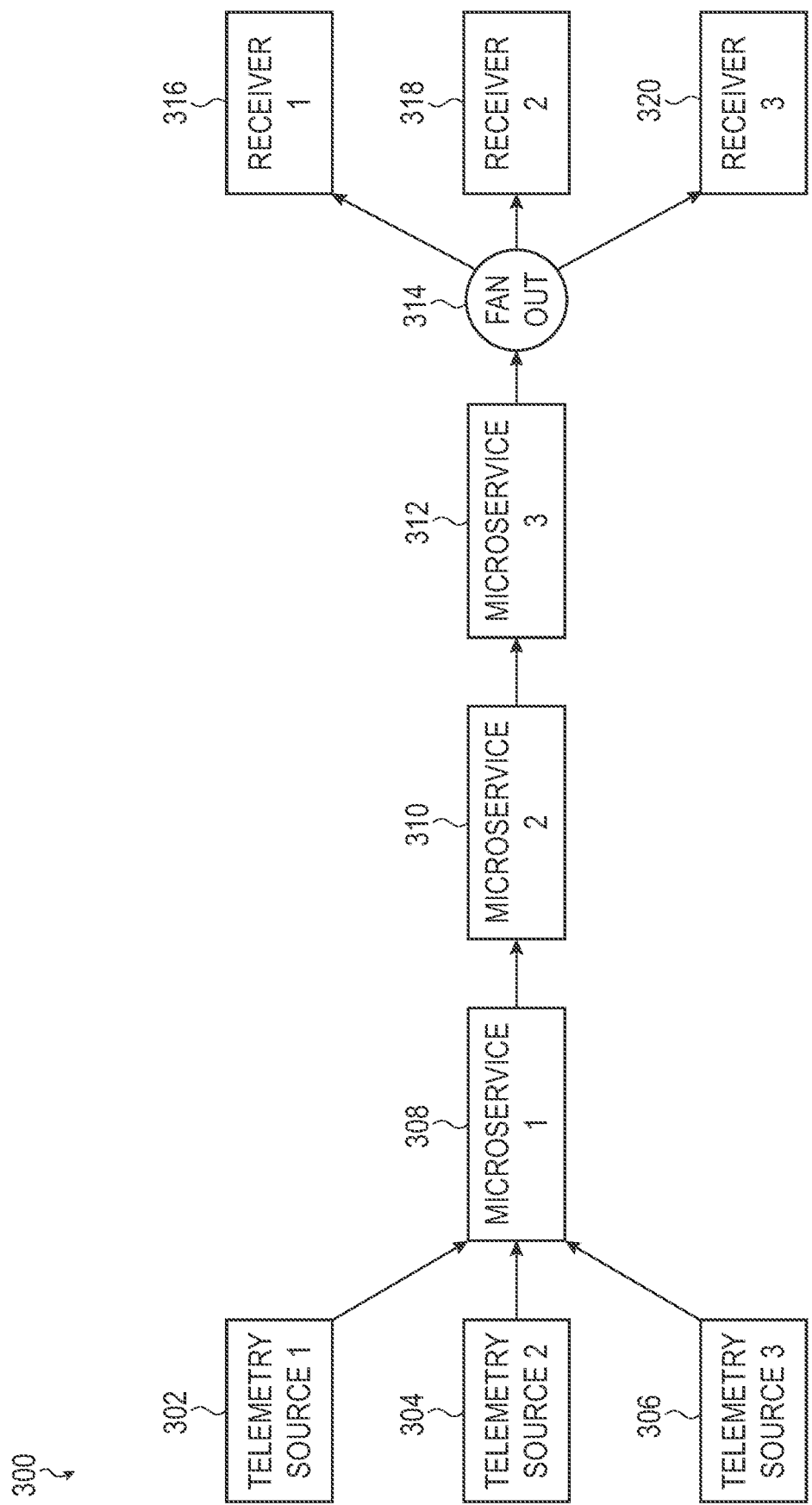
FIG. 3 depicts yet another example of a computing environment, in accordance with some embodiments.

FIG. 3 depicts another view of a computing environment in or over which embodiments, as described herein, may be implemented. As shown in a network diagram 300, a number of telemetry sources, such as a telemetry source1 302, a telemetry source2 304, and a telemetry source3 306, may send telemetry data to an application, for example, a microservice1 308. In one example, the microservice1 308 may be the telemetry data aggregator 112.

In some embodiments, the microservice1 308 may process the received telemetry data, for example, authenticate a source of telemetry data, such as the telemetry source1 302, the telemetry source2 304, and the telemetry source3 306, and validate the received telemetry data, as described herein, in accordance with some embodiments. The microservice1 308 may forward the authenticated and/or validated telemetry data to a microservice2 310.

In some embodiments, the microservice2 310 may be the MTS data processor 118, as described herein. The microservice2 310 may generate a unique hash key value based on the telemetry data received from the microservice1 308. The microservice2 310 may determine whether the generated unique hash key value exists, and upon determining the generated unique hash key value does not exist, the microservice2 310 may initialize the MTS by adding a database record for an MTS corresponding to a metric name and associated source environment identified in the received telemetry data with a measurement value set to zero (or any other user-specified value) and add another database record for the MTS corresponding the metric name and the associated source environment with a measurement value as received in the telemetry data.

However, if the microservice2 310 determines that the generated unique hash key value exists, the microservice2 310 may add a database record for an MTS corresponding a metric name and associated source environment identified in the telemetry data with a measurement value as received in the telemetry data.

The MTS data may then be communicated to a microservice3 312, which may be an MTS provider 114. The microservice3 312 may then fan out 314 to a number of receivers, such as a receiver1 316, a receiver2 318, and a receiver3 320. The number of receivers, for example, may be various frontend applications, such as the admin frontend app1 106a or the admin frontend app2 106b.

These foregoing embodiments depicted in FIG. 3 and the various alternatives thereof and variations thereto are presented, generally, for purposes of explanation, and to facilitate an understanding of various configurations and constructions of a user equipment, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4:
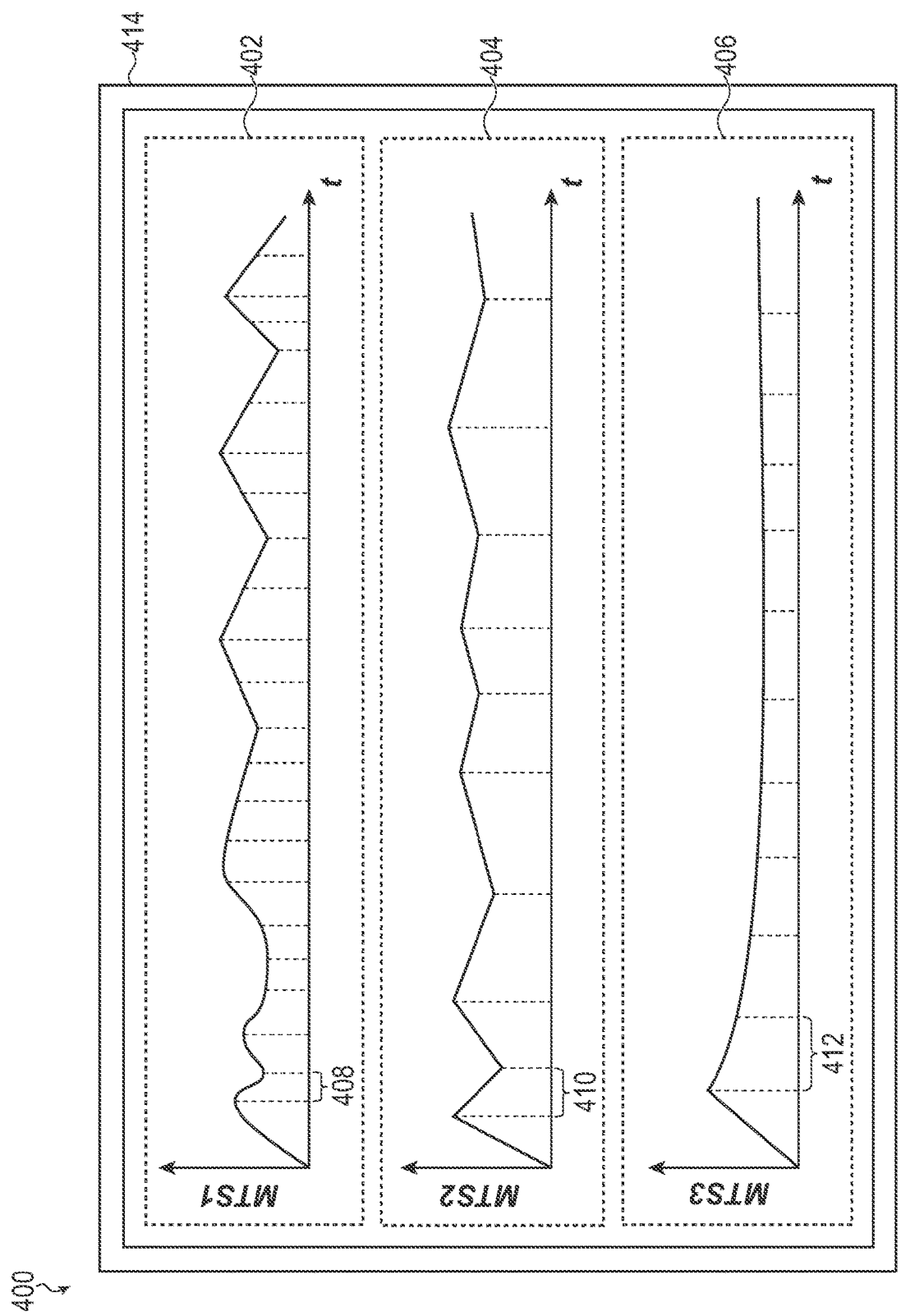
FIG. 4 is an example a graphical user interface (GUI) of a frontend application, in accordance with some embodiments.
Figure 5:
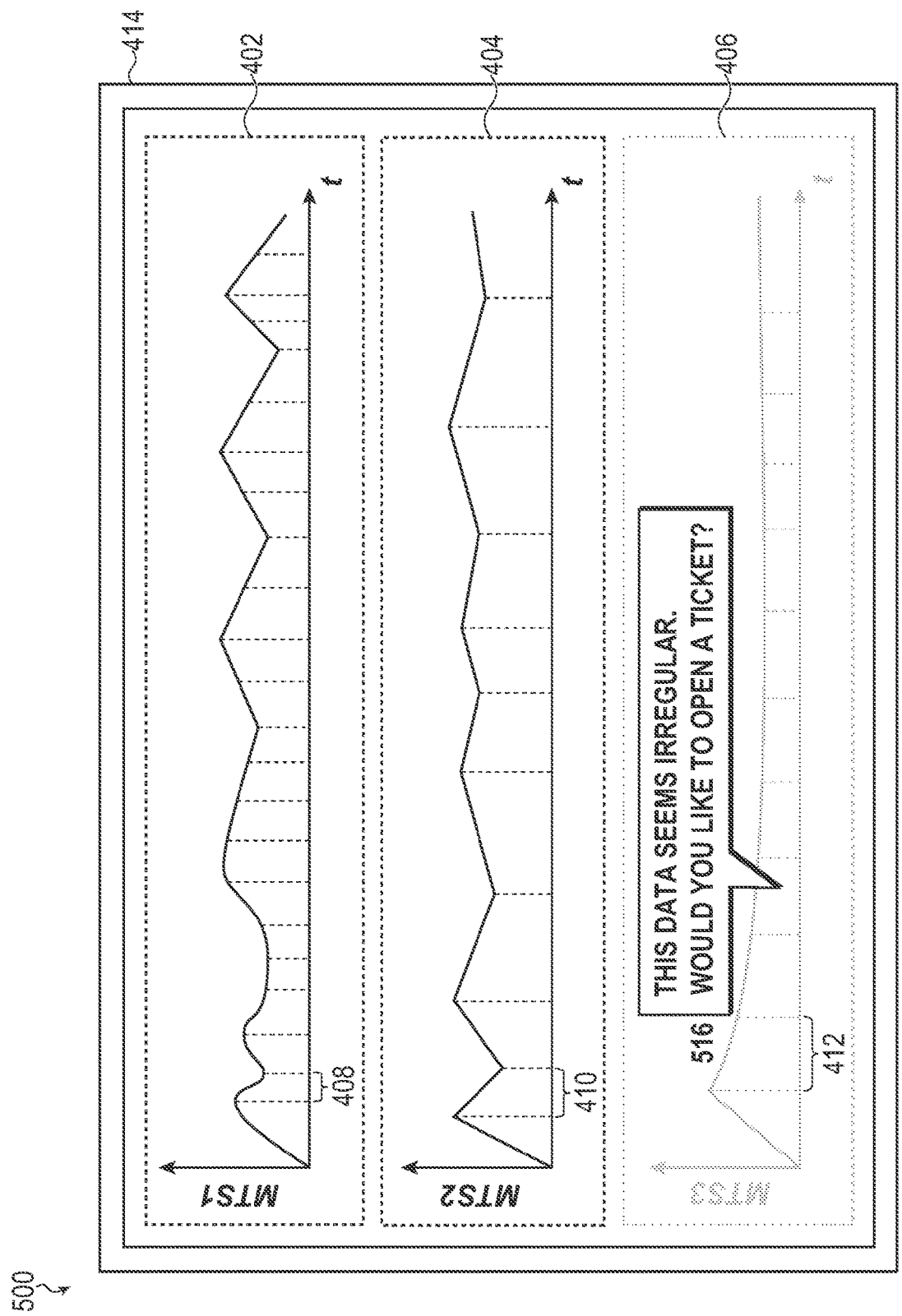
FIG. 5 is another example GUI of the frontend application of FIG. 4, in accordance with some embodiments.
Figure 6:
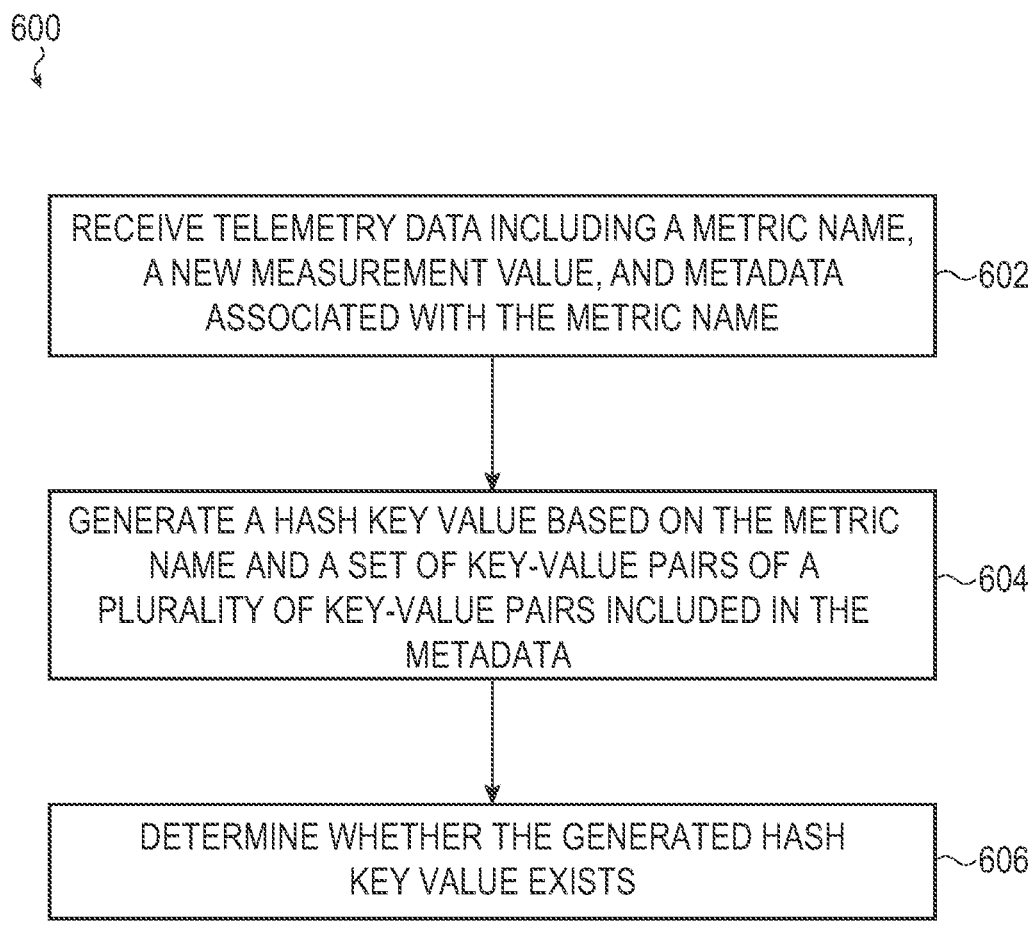
FIG. 6 depicts a flow-chart corresponding to example operations of a method for generating a metric time series, in accordance with some embodiments.
Figure 7:
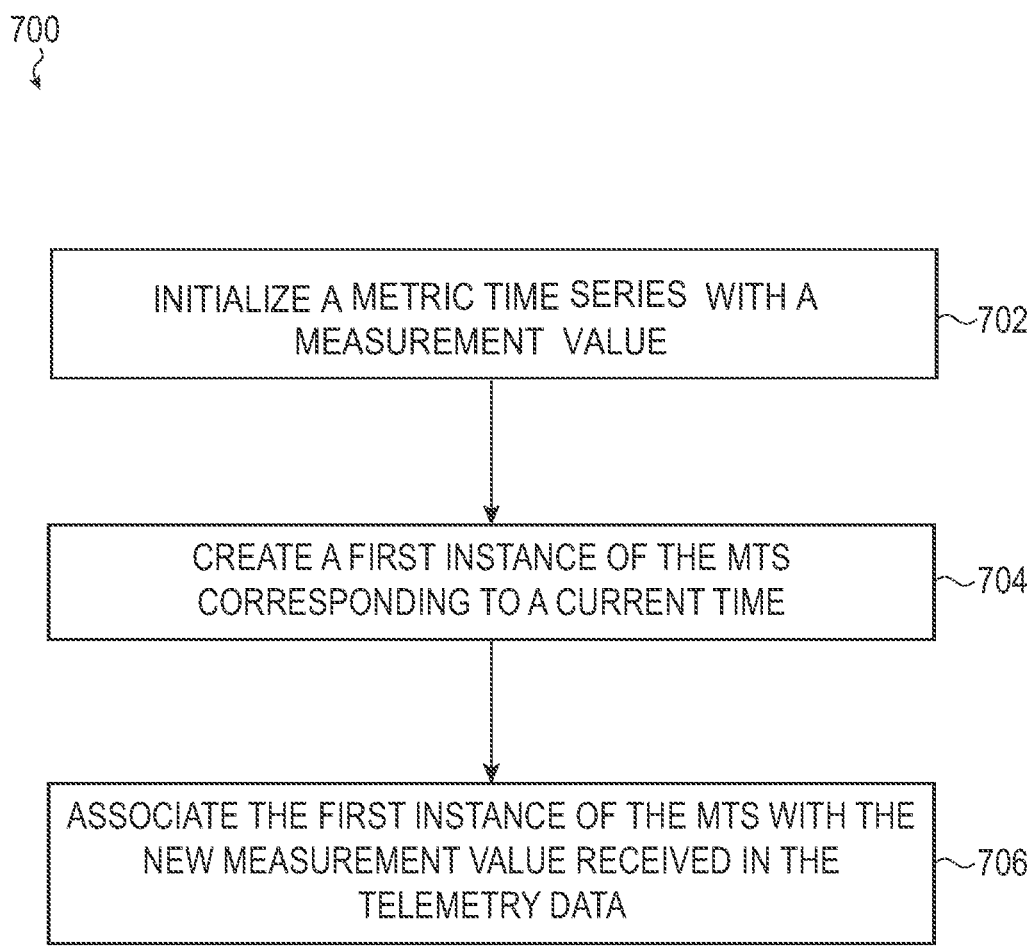
FIG. 7 depicts another flow-chart corresponding to example operations of a method for generating a metric time series, in accordance with some embodiments.
Figure 8:
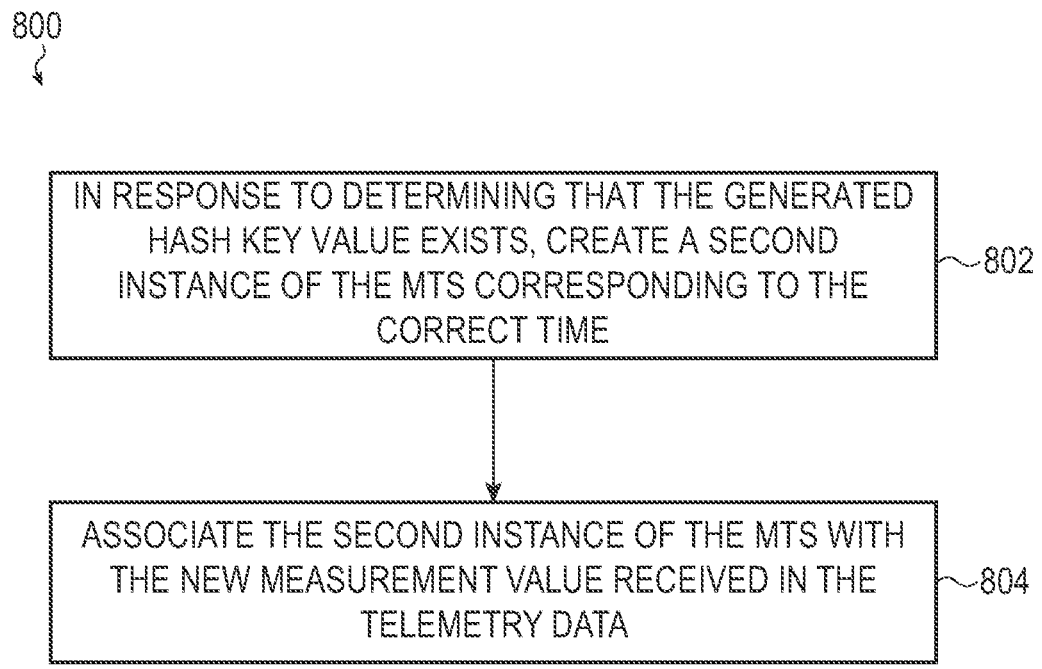
FIG. 8 depicts another flow-chart corresponding to example operations of a method for generating a metric time series, in accordance with some embodiments.

While an example implementation of the computing environment is described using FIGS. 1-3, and a flow chart of example operations corresponding to method for generating an MTS is described using FIGS. 6-8, an example screen shot of a GUI as an illustration of the principles of this disclosure is shown in FIG. 4 and FIG. 5. The examples shown in FIG. 4 and FIG. 5 are not intended to be limiting in nature and merely serve to demonstrate the use of the proposed systems and techniques.

FIG. 4 depicts an example screenshot of a graphical user interface (GUI) of a frontend application, as described herein. In one example, an example GUI 400 of a frontend application may be the admin frontend app1 106*a* or the admin frontend app2 106*b*, executing on a client device 414. Further, as shown, three MTS, an MTS1 402, an MTS2 404, and an MTS3 406 may be shown. Each of the MTS1 402, the MTS2 404, and the MTS3 406 may be associated with a unique combination of a metric name and/or a set of key-value pairs of a plurality of key-value pairs received in metadata from one or more telemetry sources. In some embodiments, by way of a non-limiting example, each of the MTS1 402, the MTS2 404, and the MTS3 406 may have a different reporting interval 408, 410, 412. In one example, the MTS1 402 may be related to memory usage of the backend application instance1 102*a*, the MTS2 404 may be related to CPU usage of the backend application instance1 102*a*, and the MTS3 406 may be related to a number of requests received by the backend application instance1 102*a*.

FIG. 5 is another example screenshot of the GUI of the frontend application, as described herein. In one example, an example GUI 500 of a frontend application, which may be the admin frontend app1 106*a* or the admin frontend app2 106*b*, executing on a client device 414. Further, as shown, for the MTS3 406, the frontend application may determine that the number of requests received by the backend application instance1 102*a* appears inconsistent, in which the same number of requests are received at each interval is the same, and may ask an operator or a user of the client device 414 whether the operator or the user would like to open a ticket for the detected inconsistency. The operator or the user may then open a ticket for debugging of the issue, in which details of the ticket may be automatically populated based on data corresponding to the MTS.

These foregoing embodiments depicted in FIG. 4 and FIG. 5, and the various alternatives thereof and variations thereto are presented, generally, for purposes of explanation, and to facilitate an understanding of various configurations and constructions of a user equipment, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

FIG. 6 depicts a flow-chart of example operations corresponding to a method for generating a metric time series, as described herein. As shown in a flow-chart 600, telemetry data including a metric name, a new measurement value, and metadata associated with the metric name may be received at 602. The telemetry data may be received from a number of telemetry sources, such as shown in FIG. 3 as the telemetry source1 302, the telemetry source2 304, and/or the telemetry source3 306, or the number of instances of the first backend application 102, and/or the number of instances of the second backend application 104. The telemetry data, at 602, may be received at the telemetry data aggregator 112, which may process the telemetry data, as described herein in accordance with some embodiments.

At 604, the received telemetry data, upon processing by the telemetry data aggregator 112, may be further processed by the MTS data processor 118 or the microservice2 310, in which a unique hash key value may be generated based on the metric name and one or more key-value pairs of a number of key-value pairs included in metadata of telemetry data received at the MTS data processor 118. The unique hash key value may be generated, at 604, by the MTS data processor 118 or the microservice2 310, as described herein in accordance with some embodiments. In some embodiments, the unique hash key value may be generated using a one-way hash function, or other method or function, such as, a checksum, a fingerprint, a cryptographic hash function, and/or a user-defined algorithm may also be used to generate a unique hash key value corresponding to a metric name and a set of key-value pairs of a number of key-value pairs received in telemetry data. Accordingly, generation of a unique hash key value is not repeated here again for brevity.

At 606, the MTS data processor 118 or the microservice2 310 may determine whether the generated unique hash key value at 604 exists. Depending on whether the generated unique hash key exists or not, the process may continue to either a flow-chart 700 shown in FIG. 7 or a flow-chart 800 shown in FIG. 8.

FIG. 7 depicts another flow-chart of example operations corresponding to a method for generating a metric time series, as described herein. As shown in the flow-chart 700, in response to determining that the generated unique hash key value at 604 does not exist, at 702, the generated unique hash key value may be stored in a memory, and a database record corresponding to an MTS associated with a metric name and corresponding source environment may be added to a database with a measurement value set to zero (or any other user-specified value). By adding a database record corresponding to an MTS associated with a metric name and corresponding source environment, the MTS may be initialized with a measurement value, which may be set to zero or any other user-specified value. In some examples, the user-specified value for initializing the MTS may be a non-zero value, and may be provided, for example, based on a historic average value or according to user-specific criteria.

At 704, a first instance of the MTS may be created corresponding to a current timestamp and based on the received telemetry data. At 704, a database record may be added that includes a metric name and corresponding source environment information. The database record added at 704 may include one or more key-value pairs received in telemetry data and identifying the source environment. A 706, a database record added at 704 corresponding to the first instance of the MTS may be associated with a new value based on a measurement value received in telemetry data by the MTS data processor 118 or the microservice2 310. Accordingly, a first MTS dataset for an MTS may be added when example operations mentioned herein using FIGS. 6 and 7 are performed.

FIG. 8 depicts another flow-chart of example operations corresponding to a method for generating a metric time series, as described herein. As shown in the flow-chart 800, in response to determining that the generated unique hash key value generated at 604 exists, at 802, a new instance (e.g., a second instance, a third instance, a fourth instance, and so on) of the MTS may be created corresponding to a current timestamp. A new instance of the MTS may be created by adding a new database record for an MTS associated with a metric name and corresponding source environment. At 804, the new instance of the MTS may be associated with a new value based on a measurement value received in telemetry data by the MTS data processor 118 or the microservice2 310. Accordingly, an MTS may be generated in which measurement values may be displayed as changes over time. Further, in some examples, a change in a measurement value with respect to a previous measurement value at a different time may be calculated.

These foregoing embodiments depicted in FIGS. 6-8 and the various alternatives thereof and variations thereto are presented, generally, for purposes of explanation, and to facilitate an understanding of various configurations and constructions of a user equipment, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A system, comprising:
one or more processors; and
one or more memories storing instructions that cause the one or more processors to instantiate at least one instance of an application to perform operations comprising:
receiving, from a source environment, telemetry data comprising a metric name, a new measurement value, and metadata associated with the metric name;
generating a hash key value based on the metric name and a set of key-value pairs of a plurality of key-value pairs included in the metadata;
determining whether the generated hash key value exists in a memory of the one or more memories;
in response to determining that the generated hash key value does not exist in the memory:
initializing a metric time series (MTS) associated with the generated hash key value with a measurement value being set to zero;
creating a first instance of the MTS corresponding to a current time; and
associating the first instance of the MTS with the new measurement value received in the telemetry data; and
in response to determining that the generated hash key value exists in the memory:
creating a second instance of the MTS corresponding to the current time by adding a database record for the MTS associated with the metric name and corresponding source environment; and
associating the second instance of the MTS with the new measurement value received in the telemetry data, wherein the second instance is different from the first instance;
in response to the receiving the telemetry data, causing a rule to be executed against the MTS, the rule identifying a value to be calculated within a time window based on the MTS and comparing the value with respect to a threshold;
calculating, by a rule engine, the value identified by the rule;
determining whether the calculated value satisfies the threshold; and
in response to determining that the calculated value satisfies the threshold, generating a notification comprising the calculated value and transmitting the notification to a user.

2. The system of claim 1, wherein for generating the hash key value, the operations further comprise:
sorting each key-value pair of the plurality of key-value pairs included in the metadata in an ascending order or a descending order; and
generating the hash key value based on the sorted plurality of key-value pairs.

3. The system of claim 1, wherein for generating the hash key value, the operations further comprise:
sorting each key-value pair of the plurality of key-value pairs included in the metadata based on sorting of each key of the plurality of key-value pairs in an ascending order or a descending order; and
generating the hash key value based on the sorted plurality of key-value pairs.

4. The system of claim 1, wherein the hash key value is generated using a one-way hash function, or wherein the generated hash key value is a one-way hash key value.

5. The system of claim 1, wherein the set of key-value pairs for generating the hash key is selected based on one or more keys of a predetermined set of keys.

6. The system of claim 1, wherein the operations further comprise:
removing the generated hash key value from the memory upon receiving no telemetry data associated the generated hash key value for a preconfigured time period.

7. The system of claim 1, wherein the telemetry data associated with the generated hash key value is received at a preconfigured measurement interval.

8. The system of claim 1, wherein the new measurement value included in the telemetry data is a numerical value.

9. A method, comprising:
receiving, at an application executing on a server, telemetry data comprising a metric name, a new measurement value, and metadata associated with the metric name;
generating, by the application, a hash key value based on the metric name and a set of key-value pairs of a plurality of key-value pairs included in the metadata, the generating the hash key value comprising generating a sorted set of key-value pairs by sorting each key-value pair of the plurality of key-value pairs in accordance with a predefined order and generating the hash key value based on the sorted set of key-value pairs;
determining, by the application, whether the generated hash key value exists in a memory of one or more memories;
in response to determining that the generated hash key value does not exist in the memory:
initializing, by the application, a metric time series (MTS) associated with the generated hash key value with a measurement value being set to zero; and
creating, by the application, a first instance of the MTS corresponding to a current time; and
associating, by the application, the first instance of the MTS with the new measurement value received in the telemetry data; and
in response to determining that the generated hash key value exists in the memory:
creating, by the application, a second instance of the MTS corresponding to the current time; and
associating, by the application, the second instance of the MTS with the new measurement value received in the telemetry data.

10. The method of claim 9, wherein generating the hash key value comprises:
sorting each key-value pair of the plurality of key-value pairs included in the metadata in an ascending order or a descending order; and
generating the hash key value based on the sorted plurality of key-value pairs.

11. The method of claim 9, wherein generating the hash key value comprises:
sorting each key-value pair of the plurality of key-value pairs included in the metadata based on sorting of each key of the plurality of key-value pairs in an ascending order or a descending order; and
generating the hash key value based on the sorted plurality of key-value pairs.

12. The method of claim 9, wherein the hash key value is generated using a one-way hash function, or wherein the generated hash key value is a one-way hash key value.

13. The method of claim 9, further comprising:
selecting the set of key-value pairs based on one or more keys of a predetermined set of keys.

14. The method of claim 9, further comprising:
removing the generated hash key value from the memory upon receiving no telemetry data associated the generated hash key value for a preconfigured time period.

15. The method of claim 9, wherein the telemetry data associated the generated hash key value is received at a preconfigured measurement interval.

16. The method of claim 9, wherein the new measurement value included in the telemetry data is a numerical value.

17. A non-transitory computer-readable medium (CRM) comprising instructions, which when executed by one or more processors of a metric time series (MTS) generator system, cause the one or more processors to perform operations comprising:
receiving telemetry data comprising a metric name, a new measurement value, and metadata associated with the metric name;
generating a unique string value based on the metric name and a set of key-value pairs of a plurality of key-value pairs included in the metadata, the generating the hash key value comprising generating a sorted set of key-value pairs by sorting each key-value pair of the plurality of key-value pairs in accordance with a criteria and generating the hash key value based on the sorted set of key-value pairs;
determining whether the generated unique string value exists in a memory of one or more memories;
in response to determining that the generated unique string value does not exist in the memory:
initializing a metric time series (MTS) associated with the generated unique string value with a measurement value being set to zero;
creating a first instance of the MTS corresponding to a current time; and
associating the first instance of the MTS with the new measurement value received in the telemetry data; and
in response to determining that the generated unique string value exists in the memory:
associating the second instance of the MTS with the new measurement value received in the telemetry data.

18. The non-transitory CRM of claim 17, wherein for generating the unique string value, the operations further comprise:
sorting each key-value pair of the plurality of key-value pairs included in the metadata in an ascending order or a descending order; and
generating the unique string value based on the sorted plurality of key-value pairs.

19. The non-transitory CRM of claim 17, wherein for generating the unique string value, the operations further comprise:
sorting each key-value pair of the plurality of key-value pairs included in the metadata based on sorting of each key of the plurality of key-value pairs in an ascending order or a descending order; and
generating the unique string value based on the sorted plurality of key-value pairs.

20. The non-transitory CRM of claim 17, wherein the unique string value is generated using a one-way hash function, or wherein the generated unique string value is a one-way hash key value.

* * * * *